US011571932B2

(12) United States Patent
Youn et al.

(10) Patent No.: US 11,571,932 B2
(45) Date of Patent: Feb. 7, 2023

(54) NON-PNEUMATIC TIRE

(71) Applicants: Hankook Tire & Technology Co., Ltd, Seoul (KR); Korea Advanced Institute of Science and Technology, Daejeon (KR)

(72) Inventors: Sung Hee Youn, Seoul (KR); Seok Ju Choi, Daejeon (KR); Myong Joong Lee, Daejeon (KR); Jeong Mu Heo, Daejeon (KR); Daniel Saakes, Daejeon (KR); Tek Jin Nam, Daejeon (KR); Seung Ryeol Kim, Daejeon (KR); Se Yeong Kim, Daejeon (KR); Yea Kyung Row, Daejeon (KR); Oo Sung Son, Daejeon (KR); Dong Hyeok Yun, Daejeon (KR); Kwang Eun Park, Daejeon (KR); Gi Tae Koo, Daejeon (KR); Jeong Yeon Lee, Daejeon (KR)

(73) Assignees: Hankook Tire & Technology Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 582 days.

(21) Appl. No.: 16/673,801

(22) Filed: Nov. 4, 2019

(65) Prior Publication Data
US 2020/0139763 A1   May 7, 2020

(30) Foreign Application Priority Data
Nov. 5, 2018   (KR) .................. 10-2018-0134661

(51) Int. Cl.
*B60C 7/12*   (2006.01)
*B60C 7/20*   (2006.01)

(52) U.S. Cl.
CPC ............... *B60C 7/125* (2013.01); *B60C 7/20* (2013.01)

(58) Field of Classification Search
CPC ................................ B60C 7/20; B60C 7/125
See application file for complete search history.

(56) References Cited

U.S. PATENT DOCUMENTS

| 1,343,684 | A | * | 6/1920 | Runyan | .................. B60C 7/125 |
| | | | | | 101/376 |
| 2,620,845 | A | * | 12/1952 | Lord | ......................... B60C 7/12 |
| | | | | | 152/328 |

(Continued)

FOREIGN PATENT DOCUMENTS

| DE | 102017115456 A1 * | 2/2018 | ............... B60B 9/26 |
| KR | 10-2004-0027984 | 4/2004 | |

(Continued)

*Primary Examiner* — Kip T Kotter
(74) *Attorney, Agent, or Firm* — Knobbe, Martens, Olson & Bear, LLP (57) ABSTRACT

The disclosed technology generally relates to a tire and more particularly to a non-pneumatic tire. The non-pneumatic tire that has maneuverability similar to a pneumatic tire even without using air pressure, and can support the load of a vehicle and can guide performance-oriented tire deformation behavior by using a meta structure. In an aspect, a non-pneumatic tire includes a tread that comes in contact with the ground, a rim that is connected with an axle, and a spoke unit that serves as a structural support between the rim and the tread, in which the spoke unit is formed in a meta structure in which unit structures are repeated.

17 Claims, 5 Drawing Sheets

(56) References Cited

U.S. PATENT DOCUMENTS

| | | | |
|---|---|---|---|
| 10,538,130 B2* | 1/2020 | Kim | B60C 7/14 |
| 2011/0168313 A1* | 7/2011 | Ma | B60C 7/14 |
| | | | 152/302 |
| 2016/0257174 A1* | 9/2016 | Fontaine | B60C 7/125 |
| 2017/0080756 A1 | 3/2017 | Van Riper et al. | |
| 2019/0143619 A1* | 5/2019 | Shin | B60C 7/102 |
| | | | 156/245 |

FOREIGN PATENT DOCUMENTS

| | | |
|---|---|---|
| KR | 10-2006-0051513 | 5/2006 |
| KR | 10-2008-0038274 | 5/2008 |
| KR | 10-2010-0090015 | 9/2010 |
| KR | 10-1725229 | 4/2017 |

* cited by examiner

NON-PNEUMATIC TIRE

INCORPORATION BY REFERENCE TO ANY PRIORITY APPLICATIONS

This application claims foreign priority to Korean Patent Application No. 10-2018-0134661, filed Nov. 5, 2018, the content of which is incorporated by reference herein in its entirety.

BACKGROUND

Field

The disclosed technology generally relates to a tire and more particularly to a non-pneumatic tire.

Description of the Related Technology

Recently, tires that are generally used can be classified into a radial tire, a bias tire, a solid tire, etc. in accordance with the structure, and the radial tire, that is, a pneumatic tire among them are used in passenger vehicles and vehicles except for special purpose vehicles. However, such a pneumatic tire has a complicated structure, requires over eight steps of manufacturing processes, discharges a non-ignorable amount of noxious substances, is accompanied by inconvenience in management such as continuously checking the air pressure that is absolutely important in performance display and safety of a pneumatic tire, and a problem with safety such as damage to the tire due to external objects pricking and applying a shock to the tire during driving.

However, a non-pneumatic tire, which is, unlike the pneumatic tire, manufactured in a new structure with a new concept process that can not only greatly decrease the manufacturing cost but also considerably decrease energy consumption and the amount of produced noxious substances, has a great advantage in that it can overcome the problem that may be caused by insufficient air pressure. Further, the non-pneumatic tire has another advantage in that it is possible to prevent standing wave, which is generated in the pneumatic tire, and remarkably reduce rotational resistance.

Since the non-pneumatic tire has a structure completely different from that of the pneumatic tire of the related art and is designed in a type that never uses compressed air unlike the pneumatic type, it is free from accidents that may occur during driving due to a loss of air pressure or insufficient air pressure (a flat tire).

There were non-pneumatic tires in the related art. Aside from carriage wheel and bicycle wheels, recently, there are a technology of supporting the load of a tire with several supports including several layers of staples in Korean Patent Application No. 2006-0051513, and a technology of providing a configuration composed of a main body made of an elastic material, a circumferential extending crown functioning as a grounding surface, and an extending side wall bonded to the crown in Korean Paten Application No. 2008-0038274. Further, there is disclosed a non-pneumatic tire including a reinforced ring-shaped band that supports the load of the tire, and a plurality of web spokes that transmits load between a wheel and a hub in an extended state in Korean Patent Application No. 2004-0027984. Recently, a technology of an airless tire configured to absorb shock through a honeycomb-shaped shock-absorbing part and to support pressure applied to the tire has been disclosed (Application No. 10-2010-0090015)

Non-pneumatic tires including a plurality of web spokes have been known to support load using only a structural reinforcing member at the tread and the tensile force of the web spokes. However, when load is supported by tensile force and compression force, it is possible to guide a more stable and appropriate grounding surface and it is accordingly possible to maximize the performance of a vehicle, including maneuverability, braking force, riding comfort, etc., as compared with when load is supported only by tensile force. Accordingly, more improved performance can be expected in a vehicle.

Further, the web spokes are open in the rotational axis of the tire, so disadvantages such as noise and deterioration of fuel consumption are latent in terms of aerodynamics due to the open structure of the web spokes when the tire is rotated.

The disclosed technology relates to a non-pneumatic tire in which web spokes are formed in the rotational direction of the tire in comparison to non-pneumatic tires introduced as recent technologies (Application No. US 2017-0080756A1 and Patent No. 10-1725229), so the external appearance is not open but closed when seen in the direction of the rotational axis of the tire, thereby having an advantage in terms of aerodynamics. Further, according to this non-pneumatic tire, as the joints inside web spokes form a meta structure, it is possible to maintain strong load supporting force as a non-pneumatic tire by specifying the structure including the direction and thickness of the joints in accordance with use and position of the tire. Further, this non-pneumatic tire has an advantage in that it is possible to have high durability and riding comfort and reduce noise as a non-pneumatic tire by smoothly absorbing various shocks.

SUMMARY OF CERTAIN INVENTIVE ASPECTS

The disclosed technology relates to a non-pneumatic tire that has maneuverability similar to a pneumatic tire even without using air pressure, and can support the load of a vehicle and can guide performance-oriented tire deformation behavior by employing a meta structure An object of the disclosed technology is to provide a technology that can maintain strong load supporting force of a non-pneumatic tire, and can provide high durability and riding comfort and reduce noise of a non-pneumatic tire by more smoothly absorbing various shocks. Further, an object of the disclosed technology is to provide a non-pneumatic tire having an advantage in terms of aerodynamics.

The objects to implement in the disclosed technology are not limited to the technical problems described above and other objects that are not stated herein will be clearly understood by those skilled in the art from the following specifications.

In order to achieve the objects, an embodiment of the disclosed technology provides a non-pneumatic tire including a tread 100 that comes in contact with the ground, a rim 300 that is connected with an axle, and a spoke unit 200 that functions as a structural support between the rim 300 and the tread 100, in which the spoke unit 200 is formed in a meta structure in which unit structures 210 are repeated.

DETAILED DESCRIPTION OF CERTAIN ILLUSTRATIVE EMBODIMENTS

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments are described in detail with reference to the accompanying drawings.

Figure 1:
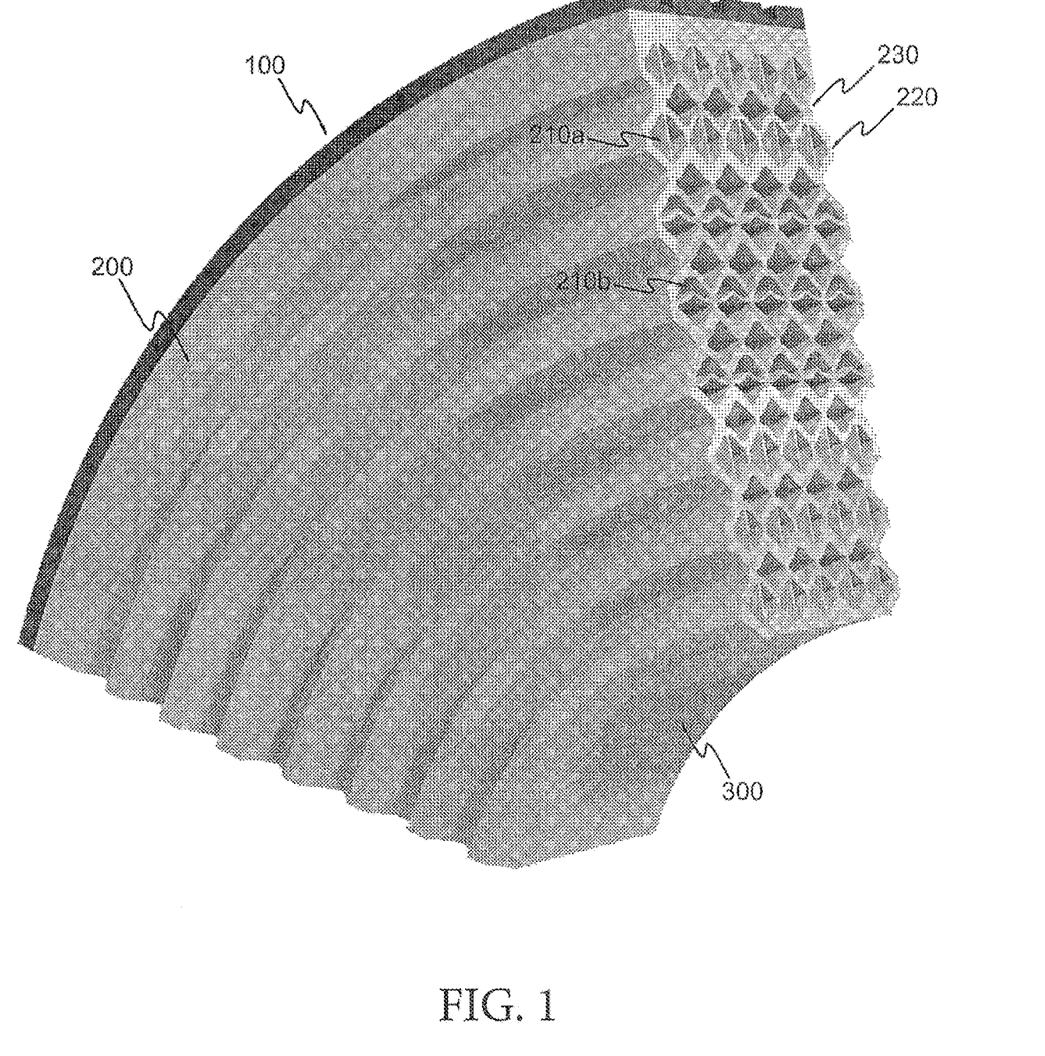
FIG. 1 is a perspective view partially showing main components of a non-pneumatic tire according to some embodiments.
Figure 2:
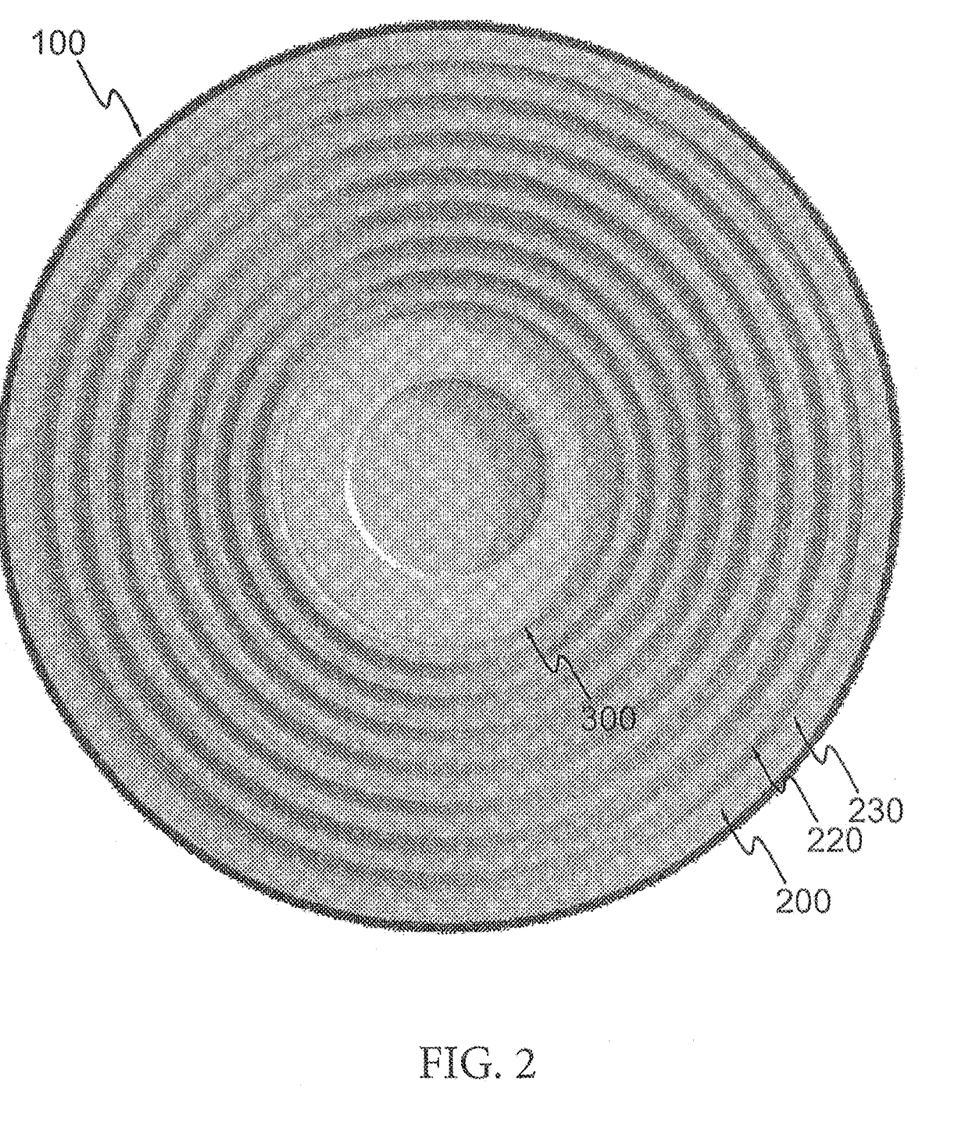
FIG. 2 is a side view of the non-pneumatic tire illustrated in FIG. 1.

FIG. 1 is a perspective view partially showing main components of a non-pneumatic tire according to some embodiments. FIG. 2 is a side view of the non-pneumatic tire illustrated in FIG. 1. The illustrated embodiment provides a non-pneumatic tire including a tread 100 that comes in contact with the ground, a rim 300 that is connected with an axle, and a spoke unit 200 that functions as a structural support between the rim 300 and the tread 100, in which the spoke unit 200 is formed in a meta structure in which unit structures 210 are repeated.

The unit structure 210 of the spoke unit 200 has a tube shape having a cavity in the circumferential direction of the tire. A structural reinforcing material such as a ring-shaped band may be disposed on the bottom of the tread 100.

That is, the disclosed technology is directed to a non-pneumatic tire for automobile that never uses compressed air and has a structure composed of the tread 100, the spoke unit 200, and the rim 300, and particularly, is characterized by having a meta structure in which the divided spoke unit 200 is positioned between the rim 300 and the tread 100 and forms webs. The non-pneumatic tire is guided to be able to make performance-oriented deformation behavior in accordance with the arrangement and thickness of joints in the meta structure.

Further, the spoke unit 200 having this web structure is open in the rotational axial direction of a tire in common non-pneumatic tires, but according to embodiments, each unit of the spoke unit having the meta structure is formed in the rotational direction of the tire, thereby forming a tube shape. An effect of improving aerodynamic characteristics and reducing noise can be expected from this structure. Such a meta concept structure makes it possible to secure strong supporting force and smoothly absorb shock using the characteristics of metal-materials.

Figure 3A:
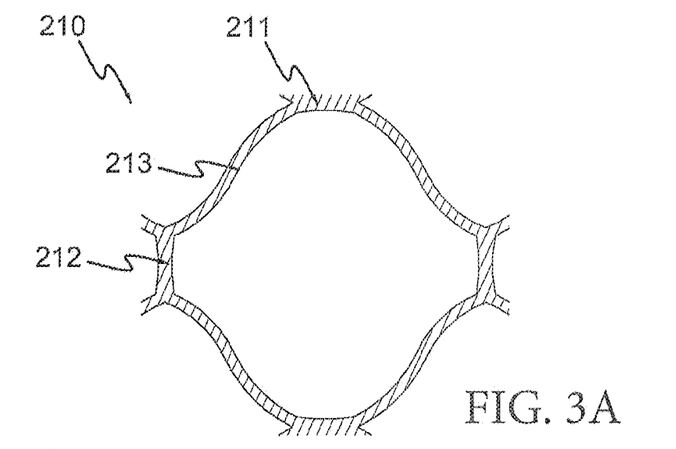
FIGS. 3A-3C are cross-sectional views of unit structures of a non-pneumatic tire according embodiments.
Figure 3B:
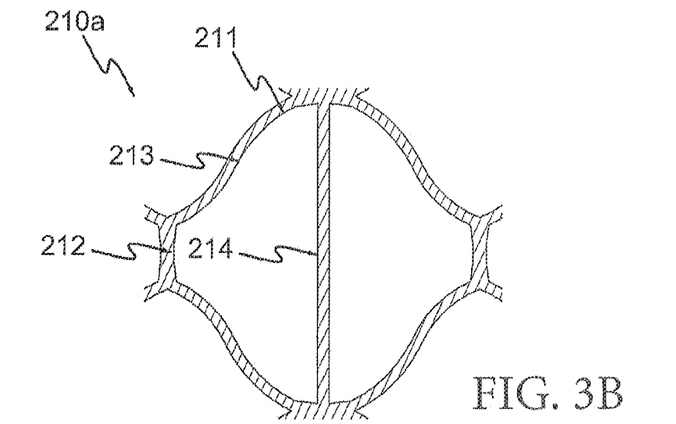
Figure 3C:
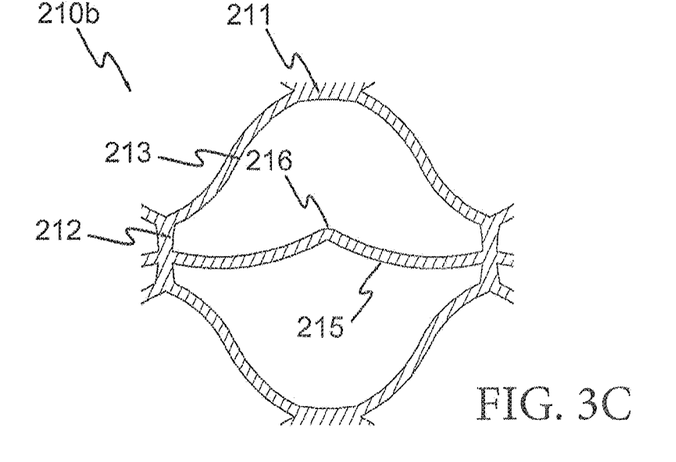
Figure 4A:
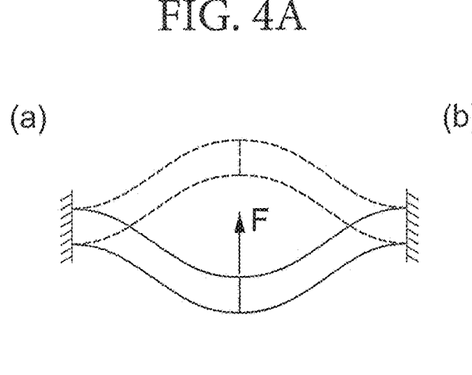
FIGS. 4A and 4B are schematic views showing a load test of a meta structure of the non-pneumatic tire according to some embodiments.
Figure 4B:
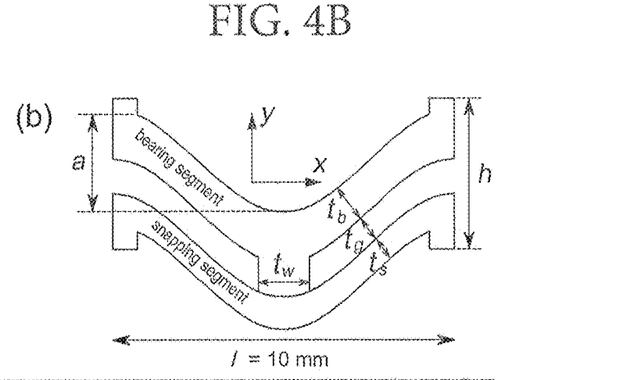
Figure 4C:
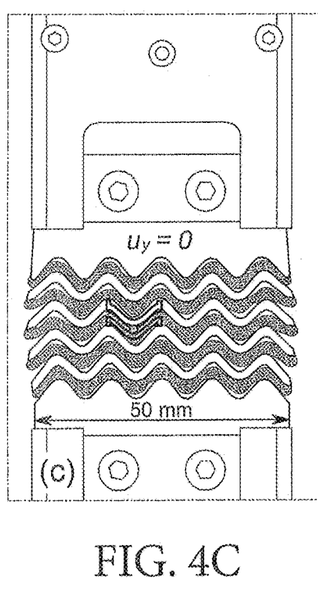
FIGS. 4C-4E are pictures showing the load test of the meta structure of the non-pneumatic tire illustrated in FIGS. 4A and 4B.
Figure 4D:
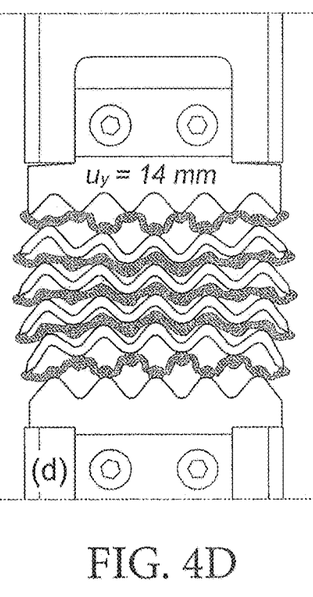
Figure 4E:
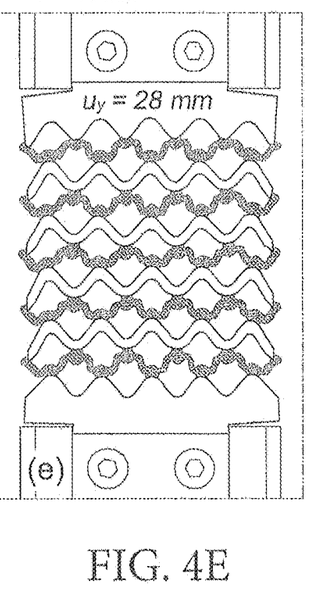

FIGS. 3A-3C are cross-sectional views of unit structures of non-pneumatic tires according to some embodiments. As shown in FIG. 3A, it is preferable that the cross-sectional shape of the unit structure 210 of the spoke unit 200 has a longitudinal protrusion 211 and a transverse protrusion 212. Further, it is preferable that an inflection point 213 is formed at a line connecting the longitudinal protrusion 211 and the transverse protrusion 212. This shape provides a cushion structure enabling each of the unit structures 210 to absorb shock, as shown in FIGS. 4A-4E. The inflection point 213, as shown in FIGS. 4A and 4B, makes repeated bending behavior of the longitudinal protrusion 211 smoother. FIGS. 4C, 4D, and 4E are pictures taken to check what bending behavior the unit structures 210 shows under up-down pressure.

If necessary, a longitudinal separation wall 214 may be formed at the center portion of the unit structure 210a. The longitudinal separation wall 214 can increase the vertical rigidity of the unit structure 210a. Further, air pressure that is obtained by injecting air is not applied to the tire according to an embodiment, but the tube-shaped space formed by the unit structure 210a is filled with air. Accordingly, the longitudinal separation wall 214 increases the rigidity of the unit structure 210a by suppressing airflow.

Further, a transverse separation wall 215 may be formed at the center portion of the unit structure 210b. It is preferable to form a protrusion 216 at the center of the transverse separation wall 215. The transverse separation wall 215 can not only further increase the rigidity of the unit structure 210b by suppressing airflow, as described above, but guide uniform contraction shape of the unit structure 210b under pressure using the protrusion 216.

Further, according to the illustrated embodiment, a side wall of the transverse protrusion 212 of the outer unit structure 210 of the spoke unit 200 protrudes, thereby forming circumferential ridge 220 and groove 230. As described above, the unit structure according to some embodiments are not formed in the axial direction but form a tube structure in the circumferential direction. Accordingly, a side wall of the transverse protrusion 212 of the outer unit structure 210 of the spoke unit 200 protrudes, thereby forming circumferential ridge 220 and groove 230. This configuration provides remarkably high air resistance ability in comparison to the non-pneumatic tire having a web spoke open in the axial direction in the related art. Further, an additional effect of improving the external aesthetic appearance of the tire can be expected from the ridge 220 and the groove 230.

It is preferable that the unit structures 210 of the spoke unit 200 are arranged 5 by 8 transversely and longitudinally, respectively, between the tread 100 and the rim 300. Further, it is preferable that the longitudinal separation wall 214 is formed at the upper two lines of unit structures 210a adjacent to the tread 100 and lower three lines of unit structures 210b adjacent to the rim 300, that the transverse separation wall 215 is formed at three middle lines between the upper two lines and the lower three lines, and that the transverse separation wall 215 has the protrusion 216 at the center. This is an optimal configuration derived in consideration of the material of the spoke unit 200 and the load that is generally applied to the tires of passenger vehicles.

If there are too many unit structures 210, it takes a long time for contracted tire to return to the initial shape, which causes a severe problem with safety in driving. If there are too few unit structures 210, load cannot be sufficiently supported.

Figure 5A:
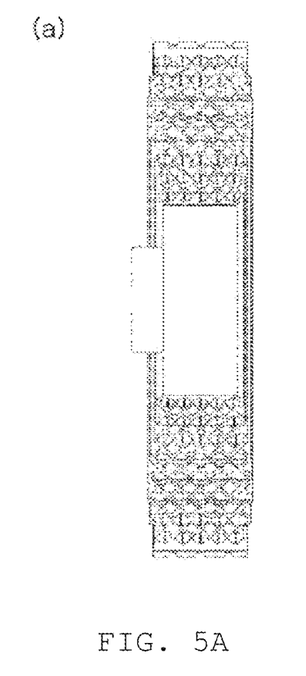
FIGS. 5A-5C are views illustrating behavior by force that is applied when a non-pneumatic tire according to an embodiment is operated.
Figure 5B:
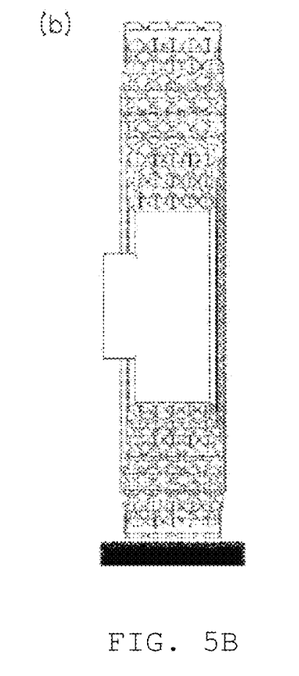
Figure 5C:
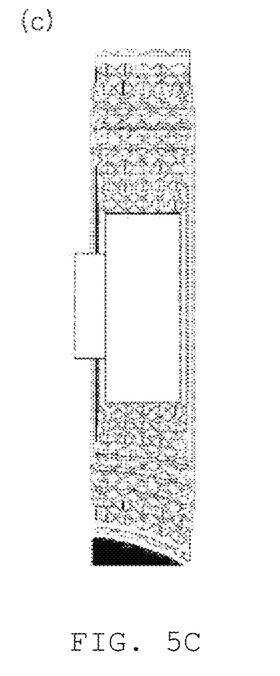

FIG. 5A-5C illustrate behavior by force that is applied when the non-pneumatic tire according to an embodiment is operated. FIG. 5A shows a state when load is not applied and FIG. 5B shows a state when the tire is mounted to a vehicle and receives the load of the vehicle. FIG. 5C shows a driving state in cornering or on an inclined road surface. As shown in FIGS. 5A-5C, the unit structure 210 according to an embodiment is individually deformed in response to pressure in accordance with the state of a road surface and appropriately distributes load in accordance with a required level.

In addition, it is preferable that the total width of the lower three lines of unit structures is smaller than the total width of the middle three lines of unit structures. This is for improving structural density because greater load is applied to the portion close to the rim 300.

That is, embodiments are intended to improve the performance of a non-pneumatic tire for improving maneuverability and riding comfort by applying and using a structural reinforcing material structure that is advantageous in terms as steering performance and vibration absorption in cornering of a tire structurally supporting the load of a vehicle. The embodiments have sufficient structural rigidity as a non-pneumatic tire, so it is possible to sufficiently support the load of a vehicle and expect an effect of maximizing harmony of the steering characteristic and the riding comfort characteristic.

The non-pneumatic tire according to some embodiments uses a meta structure, so meta concept provides strong supporting force and smooth shock absorption effect using a structural meta-material, and there is no possibility of flat tire because it is a non-pneumatic tire that does not need injection of air.

Further, structural density is increased at the portion around the grounding surface and the portions around the surface being in contact with the shaft of a wheel in order to increase supporting force when the structure is applied. Accordingly, it is possible to increase the supporting force on a road surface and smoothly absorb various kinds of shock.

The closed structure at a side wall is advantageous in terms of noise reduction, as compared with the spoke type NPT of the related art, and can expect an effect of improving aesthetic external appearance by implementing a new NPT structure.

That is, embodiments are intended to improve the performance of a non-pneumatic tire for improving maneuverability and riding comfort by applying and using a structural reinforcing material structure that is advantageous in terms as steering performance and vibration absorption in cornering of a tire structurally supporting the load of a vehicle. The non-pneumatic tire has an asymmetric spoke structure, as compared with spokes of the related art, and a tube-shaped reinforcing material structure so it has sufficient structural rigidity as a non-pneumatic tire. According to this configuration, it is possible to sufficiently support the load of a vehicle and expect an effect of maximizing harmony of the steering characteristic and the riding comfort characteristic.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A non-pneumatic tire comprising:
   a tread configured to come in contact with the ground,
   a rim configured to be connected with an axle, and
   a spoke unit that serves as a structural support between the rim and the tread,
   wherein the spoke unit is formed in a meta structure in which unit structures are repeated,
   wherein each unit structure comprises a cavity in which a longitudinal separation wall or a transverse separation wall lay across, the longitudinal separation wall extending in a direction substantially orthogonal the transverse separation wall, and
   wherein some of the unit structures comprise cavities each having the longitudinal separation wall and some others of the unit structures comprise cavities each having the transverse separation wall.

2. The non-pneumatic tire of claim 1, wherein each unit structure of the spoke unit has a tube shape having the cavity in the circumferential direction of the tire.

3. The non-pneumatic tire of claim 2, wherein a cross-sectional shape of each unit structure of the spoke unit has a longitudinal protrusion and a transverse protrusion.

4. The non-pneumatic tire of claim 3, wherein an inflection point is formed between the longitudinal protrusion and the transverse protrusion.

5. The non-pneumatic tire of claim 4, wherein the longitudinal separation wall is formed at a center portion of the respective unit structures.

6. The non-pneumatic tire of claim 4, wherein the transverse separation wall is formed at a center portion of the respective unit structures.

7. The non-pneumatic tire of claim 6, wherein each transverse separation wall has a protrusion at a center portion thereof.

8. The non-pneumatic tire of claim 3, wherein a side wall of the transverse protrusion of an outer unit structure of the spoke unit protrudes, thereby forming a circumferential ridge and a groove.

9. The non-pneumatic tire of claim 8, wherein the unit structures of the spoke unit are arranged 5 by 8 transversely and longitudinally, respectively, between the tread and the rim.

10. The non-pneumatic tire of claim 9, wherein the longitudinal separation wall is formed at upper two rows of unit structures adjacent to the tread and lower three rows of unit structures adjacent to the rim, the transverse separation wall is formed at three middle rows between the upper two rows and the lower three rows, and the transverse separation wall has a protrusion at a center thereof.

11. A non-pneumatic tire comprising:
a tread configured to come in contact with the ground;
a rim configured to be connected with an axle; and
a spoke unit that serves as a structural support between the rim and the tread,
wherein the spoke unit is formed in a meta structure in which unit structures are repeated,
wherein each of the unit structures of the spoke unit has a tube shape having a cavity in the circumferential direction of the tire,
wherein a cross-sectional shape of each the unit structures of the spoke unit has a longitudinal protrusion and a transverse protrusion, and
wherein an inflection point is formed between the longitudinal protrusion and the transverse protrusion.

12. The non-pneumatic tire of claim 11, wherein a longitudinal separation wall is formed at a center portion of respective unit structures.

13. The non-pneumatic tire of claim 11, wherein a transverse separation wall is formed at a center portion of respective unit structures.

14. The non-pneumatic tire of claim 13, wherein each transverse separation wall has a protrusion at a center portion thereof.

15. The non-pneumatic tire of claim 11, wherein a side wall of the transverse protrusion of an outer unit structure of the spoke unit protrudes, thereby forming a circumferential ridge and a groove.

16. The non-pneumatic tire of claim 15, wherein the unit structures of the spoke unit are arranged 5 by 8 transversely and longitudinally, respectively, between the tread and the rim.

17. The non-pneumatic tire of claim 16, wherein a longitudinal separation wall is formed at upper two rows of unit structures adjacent to the tread and lower three rows of unit structures adjacent to the rim, a transverse separation wall is formed at three middle rows between the upper two rows and the lower three rows, and the transverse separation wall has a protrusion at a center thereof.

* * * * *